US011047505B2

(12) United States Patent
Choate et al.

(10) Patent No.: US 11,047,505 B2
(45) Date of Patent: Jun. 29, 2021

(54) QUICK CONNECT ACTUATOR

(71) Applicant: Baker Hughes Oilfield Operations LLC, Houston, TX (US)

(72) Inventors: Jeremy Ryan Choate, Houston, TX (US); Keith Adams, Katy, TX (US); Robert Law, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 48 days.

(21) Appl. No.: 16/527,696

(22) Filed: Jul. 31, 2019

(65) Prior Publication Data

US 2021/0033211 A1 Feb. 4, 2021

(51) Int. Cl.
  *F16K 31/126* (2006.01)
  *F16K 3/316* (2006.01)
  *F16K 31/56* (2006.01)

(52) U.S. Cl.
  CPC .......... *F16K 31/1262* (2013.01); *F16K 3/316* (2013.01); *F16K 31/56* (2013.01)

(58) Field of Classification Search
  CPC ....... F16K 31/1262; F16K 31/56; F16K 3/316
  See application file for complete search history.

(56) References Cited

U.S. PATENT DOCUMENTS

| | | | |
|---|---|---|---|
| 4,421,146 A | 12/1983 | Bond | |
| 4,871,143 A * | 10/1989 | Baker | F16K 3/0254 251/58 |
| 6,015,134 A * | 1/2000 | Johnson | F16K 31/1262 137/556 |
| 6,684,901 B1 | 2/2004 | Cahill | |
| 8,991,420 B2 * | 3/2015 | Adams | F16K 37/0008 137/556 |
| 9,212,758 B2 * | 12/2015 | Adams | F15B 15/1438 |
| 9,568,117 B2 * | 2/2017 | Adams | F16K 31/1262 |
| 9,759,240 B2 * | 9/2017 | McEvoy | F15B 15/1438 |
| 2010/0072410 A1 | 3/2010 | Lacasse | |
| 2016/0025227 A1 | 1/2016 | Boretti | |
| 2016/0053897 A1 | 1/2016 | Rogers | |

OTHER PUBLICATIONS

International Search Report and Written Opinion dated Nov. 30, 2020 in corresponding PCT Application No. PCT/US20/42555.

* cited by examiner

*Primary Examiner* — Kevin R Barss
(74) *Attorney, Agent, or Firm* — Hogan Lovells US LLP

(57) ABSTRACT

A quick connect coupling mechanism joins an actuator to a bonnet. The quick connect coupling mechanism may utilize machined or otherwise prepared components including one or more specific features, such as slots or grooves, to facilitate a connection between the actuator and the bonnet. For example, the actuator housing may be machined or formed to include an opening to enable radial insertion of the bonnet into a slot formed circumferentially about at least a portion of the actuator housing. The opening may be secured to block radial movement of the bonnet within the housing. A rail system may also be utilized to couple the actuator housing to the bonnet. For example, pairs of grooves may be formed in the actuator housing and bonnet to facilitate insertion of rails. The rails may block both axial movement of the actuator housing and also block rotational movement.

19 Claims, 10 Drawing Sheets

QUICK CONNECT ACTUATOR

BACKGROUND

1. Field of the Invention

The present disclosure relates in general to valve systems and more particularly to quick connect actuators.

2. Description of Related Art

During downhole drilling and recovery operations, various tools may be tripped into and out of a wellbore to perform a number of different tasks. Wellbores may include wellbore assemblies at the surface that include one or more valves to regulate flow into and out of the wellbore. Valves may be routinely changed or undergo maintenance, where various components are removed. It may be difficult and time consuming to decouple various components of a valve assembly, such as removing an actuator from the bonnet. This process may involve multiple different parts and be challenging for operations. Moreover, downtime may hinder operations at a well site.

SUMMARY

Applicants recognized the problems noted above herein and conceived and developed embodiments of systems and methods, according to the present disclosure, for valve systems.

In an embodiment, a system for coupling components of a valve assembly includes an actuator housing having a slot arranged in an interior portion, the slot extending circumferentially about at least a portion of a circumference of the interior portion. The system also includes a bonnet positioned at least partially within the interior portion of the actuator housing, the bonnet having a lip extending at least partially into the slot. The system further includes an actuator connector positioned within the interior portion having a connector opening adapted to receive a valve stem. The valve stem, at least a portion of the valve stem arranged within the connector opening, wherein radial movement of the valve stem is blocked, at least in part, by an interface between the slot and the lip.

In another embodiment, a system for coupling components of a valve assembly includes an actuator including a first mating face at a bottom end. The system also includes a bonnet including a second mating face at a top end, the first mating face abutting against the second mating face. The system includes a first actuator groove, formed at the first mating face. The system further includes a first bonnet groove, formed at the second mating face, the first actuator groove aligning with the first bonnet groove to form a passage between the actuator and the bonnet. The system includes a first rail extending through the passage, the first rail blocking movement of the actuator with respect to the bonnet in at least two directions.

In an embodiment, a method for coupling valve assembly components together includes aligning an actuator housing with a bonnet. The method also includes engaging a valve stem, of the valve assembly, with an actuator connector. The method further includes determining the actuator housing is in an engaged position. The method also includes coupling the actuator housing to the bonnet via a coupling mechanism to block movement of the actuator housing in at least two directions.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
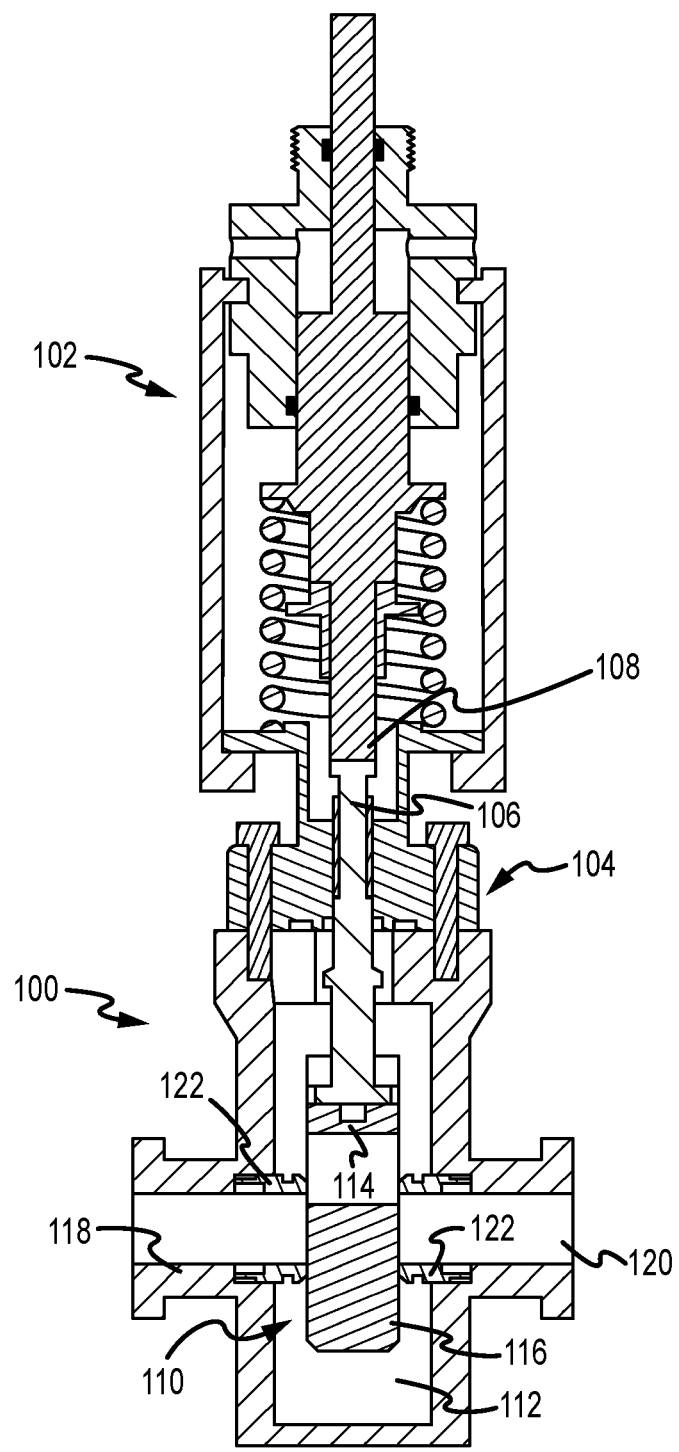
FIG. 1 is a schematic cross-sectional view of an embodiment of a valve assembly having an actuator, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure.

Embodiments of the present disclosure include a quick connect coupling mechanism to join an actuator to a bonnet. In various embodiments, the quick connect coupling mechanism may utilize machined or otherwise prepared components including one or more specific features. For example, in embodiments, the actuator housing may be machined or formed to include an opening to enable radial insertion of the bonnet into a slot formed circumferentially about at least a portion of the actuator housing. The opening may be aligned with an opening in an actuator connector to facilitate capture and engagement with a valve stem. Thereafter, the opening may be secured to block radial movement of the bonnet within the housing. In various embodiments, a rail system may also be utilized to couple the actuator housing to the bonnet. For example, pairs of grooves may be formed in the actuator housing and bonnet to facilitate insertion of rails. The rails may block both axial movement of the actuator housing and also block rotational movement. These features may utilize less material and also simplify installation methods.

In various embodiments, a quick connect double horseshoe actuator is utilized to couple both a bonnet to an actuator housing and a valve stem to an actuator. The actuator is attached to a bonnet by means of a horseshoe connection. The stem of the actuator also has a horseshoe connection which is engaged at the same time as the actuator bonnet horseshoe connection. In embodiment, a bonnet is machined with a round lower flange for connection to a valve body and a round upper flange prepped for an actuator. The actuator housing has a horseshoe style connection machined into it, with an opening on the side of the housing for passage of the bonnet flange. The actuator will slide through the opening in the housing and stop sliding when the horseshoe connection on the stem is also engaged. The housing horseshoe connection will take the load from the actuator. In various embodiments, a cover plate may be used to close the opening, but other sealing or closing mechanisms may be used. Embodiments of the present disclosure simplify the connection of an actuator to a valve bonnet, which will increase the speed of assembly due to the nature of the connection and fewer required parts and less machining on the housing.

In various embodiments, systems and methods for coupling actuators to a bonnet utilize a rail-type connection. The rail type connection may limit rotation of the actuator while also receiving a load from the actuator. For example, a bonnet and an actuator housing may include dovetail grooves, which may be substantially identical and mirrored, machined across respective mating faces. During installation, the actuator and bonnet are rested upon each other, the grooves are aligned, and a rail type part is inserted into the groove. The rail connection blocks the actuator from rotating and also will take the load from the actuator. The rail can be secured by any means into the groove, for example a covering or fastener. In various embodiments of the present disclosure, the connection between the actuator and valve bonnet is simplified. As a result, a speed of forming the connection is increased, which reduces operator time. Furthermore, embodiments may be formed with minimal machining or formed using a reduced number of parts.

FIG. 1 is a cross-sectional side elevation view of an embodiment of a valve assembly 100 that includes an actuator 102 coupled to a bonnet 104. As will be described below, in various embodiments components of the actuator 102 and the bonnet 104 may be machined or fabricated to facilitate connection using a quick connect system. As noted below, the quick connect system may utilize one or more components to facilitate coupling without using threaded fittings, such as bolts, between the actuator 102 and the bonnet 104. In various embodiments, the quick connect system may also reduce a number of threaded fittings used. Embodiments of the present disclosure may include the actuator 102 including a slot, which may be a circumferential, or at least partially circumferential, slot that receives a lip of the bonnet 104. The interaction between the slot and the lip may enable the actuator 102 to slide over the bonnet 104. It should also be appreciated that, in various embodiments, the actuator 102 may include the lip and the bonnet 104 may include the slot. As will be described embodiments, embodiments may further include a horseshoe coupling, or other components, that enables capture and coupling to a valve stem at substantially the same time as the actuator 102 is secured to the bonnet 104. It should be appreciated that the quick connect system may be described herein as including a coupling mechanism which may include features of the actuator 102, bonnet 104, and/or other connectors or components associated with the actuator 102 and/or the bonnet 104. Furthermore, various embodiments may also include slots or other features formed in one or more of the actuator 102 and/or the bonnet 104 to receive external components, such as rails, to block axial movement of the actuator 102 and the bonnet 104 relative to one another. The illustrated actuator 102 is coupled to a valve stem 106, via a connector 108 that will be described below, that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, the actuator 102, which may be manual or automated (e.g., hydraulic, pneumatic, electric, etc.), drives movement of the valve member 110 between the open position and the closed position. When moving the valve member 110 from the closed position to the open position, the actuator overcomes an opposing force present in the valve 100 (e.g., the pressure of the fluid). In various embodiments, the force of the actuator 102 may be transferred to the bonnet 104, at least in part. As a result, a robust connection between the actuator 102 and the bonnet 104 is desirable. However, it may be difficult to couple the actuator 102 to the bonnet 104 when various bolts, clamps, fittings, and the like are utilized. Furthermore, forming the connection between the connector 108 and the valve stem 106 may be challenging, thereby reducing operational time at the well site. Embodiments of the present disclosure, however, include one or more features to facilitate easier connection of the actuator 102 to the bonnet 104. Furthermore, the connection may be made at substantially the same time as coupling the connector 108 to the valve stem 106, further improving installation times.

Figure 2:
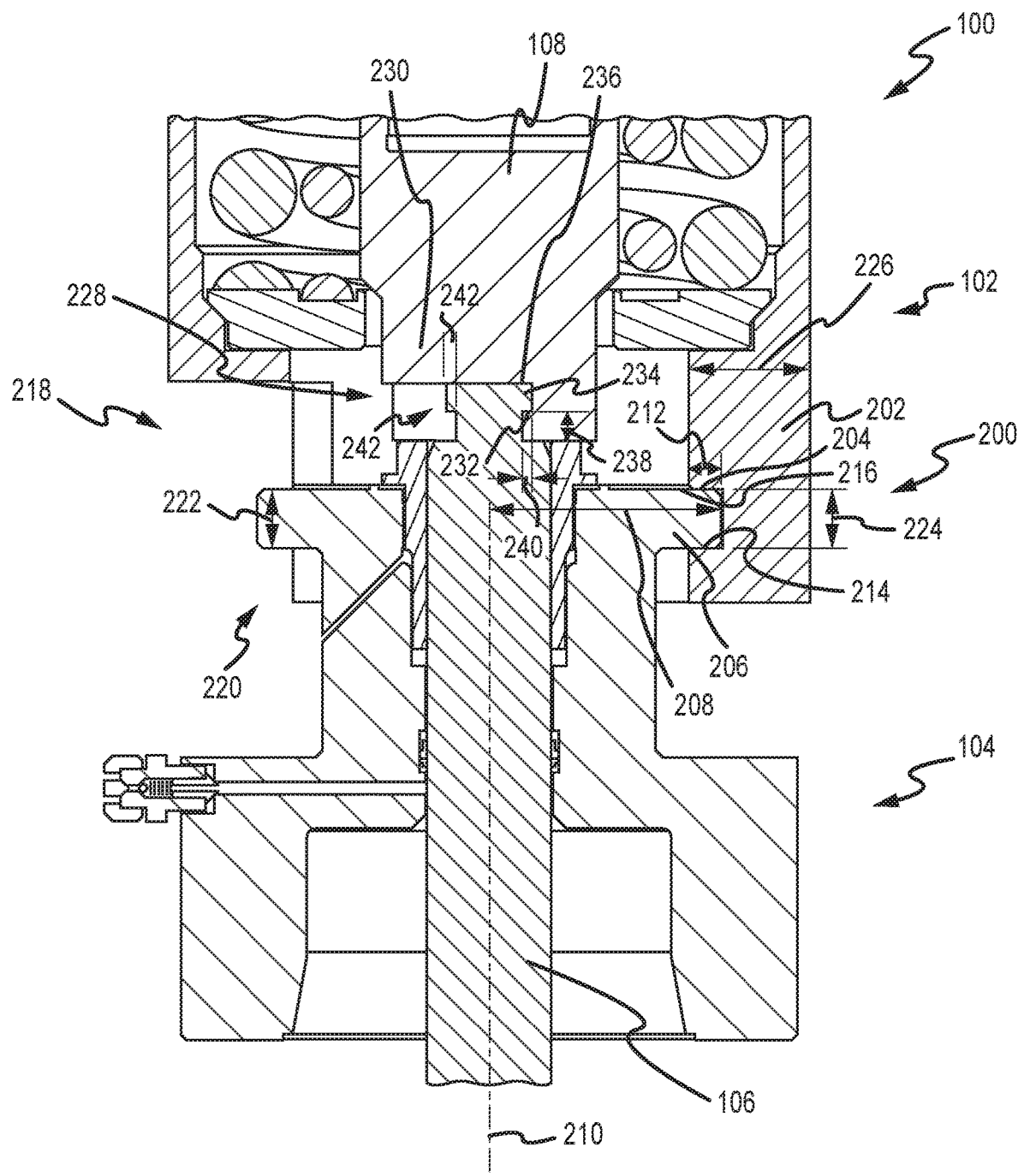
FIG. 2 is a cross-sectional view of an embodiment of a coupling mechanism that may be used with a valve assembly, in accordance with embodiments of the present disclosure.

FIG. 2 is partial cross-sectional side view of an embodiment of the valve assembly 100 illustrating the actuator 102 coupled to the bonnet 104 via a coupling mechanism 200. As noted above, the coupling mechanism 200 may describe one or more components, which may also form components of the actuator housing 202 and/or the bonnet 104, that facilitates coupling of the components without or using a reduced number of threaded fittings between the actuator 102 and the bonnet 104. In various embodiments, the coupling mechanism 200 may include, for example, a slot formed in the actuator 102 that receives a lip of the bonnet 104, thereby facilitating the actuator 102 to slide over or otherwise engage the bonnet 104. Furthermore, in various embodiments, the coupling mechanism 200 may further include components that engage the valve stem 106, such as a horseshoe connector or the like. Embodiments may also include slots formed in one or more of the actuator 102 and/or the bonnet 104 to receive external components, such as rails. The illustrated coupling mechanism 200 enables an actuator housing 202 of the actuator 102 to slide over the bonnet 104, for example, by aligning a slot 204 formed in the actuator housing 202 with a lip 206 of the bonnet 104. As noted above, one or more of the slot 204 and/or the lip 206 may be considered to be portions of the coupling mechanism 200. In the illustrated embodiment, the lip 206 extends a radial length 208 away from an axis 210 of the bonnet 104. The radial length 208 is sufficient to enter the slot 204, which extends a radial length 212 into the actuator housing 202. In certain embodiments, for example the embodiment illustrated in FIG. 2, only a portion of the lip 206 extends into the slot 204. However, it should be appreciated that any amount of the lip 206 may be arranged within the slot 204, as the distance the lip 206 extends into the slot 204 may be based, at least in part, on operating conditions of the valve assembly 100.

The illustrated actuator housing 202 extends circumferentially about the lip 206 of the bonnet 104 and is arranged at least partially radially outward from the lip 206 of the bonnet 104. The slot 204 formed within the actuator housing 202 includes a shoulder 214, which may block axial movement of the bonnet 104 and/or the actuator housing 202 along the axis 210 in at least one direction. Furthermore, a stop 216 is positioned to block axial movement of the bonnet 104 and/or the actuator housing 202 along the axis 210 in at least one direction, which may be opposite the direction associated with the shoulder 214. As a result, axial movement of the bonnet 104 and/or the actuator housing 202 may be restricted when the actuator housing 202 is coupled to the bonnet 104.

The actuator housing 202 further including an opening or entrance 218 to enable the bonnet 104 to transition from a position outside the actuator housing 202 to a position within an internal portion 220 of the actuator housing 202. A size of the opening 218 may be particularly selected based on a size of the bonnet 104. For example, a diameter of the opening 218 may be selected to substantially conform to a diameter of the bonnet 104, for example, to be larger than the diameter of the bonnet 104 to enable entrance into the interior portion 220.

As noted above, various components of the bonnet 104 and/or the actuator housing 202 may be sized, based at least in part, on expected operating conditions. For example, a lip thickness 222, a slot thickness 224, a housing thickness 226, and the like may be particularly selected and may be larger to accommodate larger operating conditions.

As discussed above, part of the challenge with coupling the actuator 102 to the bonnet 104 is with aligning the connector 108 with the valve stem 106. In the illustrated embodiment, however, a horseshoe-type connector 108 may be utilized to facilitate alignment with the valve stem 106. For example, the connector 108 may include an opening 228 extending into a body 230 of the connector 108. The opening 228 may extend toward an engagement shoulder 232 arranged to mate with an overhang 234 of the valve stem 106. Accordingly, force from the actuator 102 is transmitted to the valve stem 106, at least in part, due to the mating connection between the engagement shoulder 232 and the overhang 234. The illustrated embodiment further includes a connector stop 236, which may be used, in connection with the engagement shoulder 232, to restrict axial movement of the valve stem 106 along the axis 210. As noted above, in various embodiments, the connector 108 may include or more feature that may be considered to be at least a portion of the coupling mechanism 200.

In various embodiments, the opening 218 and the connector opening 228 are substantially aligned, and as a result, as the actuator housing 202 engages the bonnet 104 the connector opening 228 will also engage the valve stem 106. In this manner, turning or twisting to capture the valve stem 106 may be reduced, which simplifies installation. As noted above with respect to other components, features such as an engagement shoulder thickness 238, engagement shoulder length 240, and overhang length 242, among others, may be particularly selected based on the operating conditions of the valve assembly.

Figure 3:
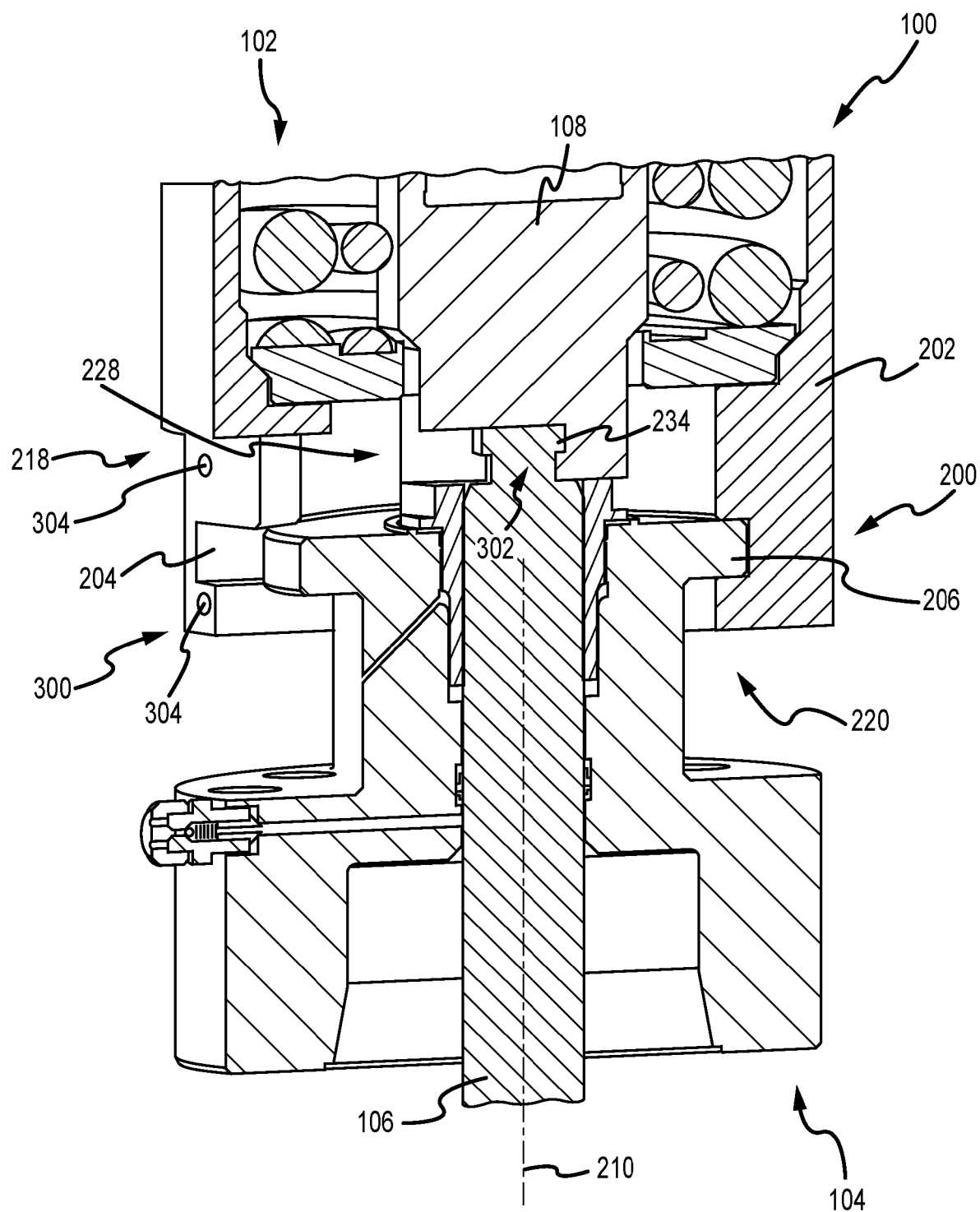
FIG. 3 is a cross-sectional view of an embodiment of a coupling mechanism that may be used with a valve assembly, in accordance with embodiments of the present disclosure.

FIG. 3 is a partial cross-sectional perspective view of an embodiment of the valve assembly 100 illustrating the bonnet 104 arranged within the interior 220 of the actuator housing 202. In the illustrated embodiment, the bonnet 104 has engaged the actuator housing 202, for example, via the coupling mechanism 200. Moreover, as described above, the valve stem 106 is also engaged with the connector 108 due to the alignment between the opening 218 and the opening 228, which facilitates coupling of both the bonnet 104 and the valve stem 106 at substantially the same time (e.g., close in time).

The illustrated embodiment includes the slot 204 that extends substantially about a circumference 300 of the actuator housing 202. It should be appreciated that, in various embodiments, the slot 204 extends for the entire circumference 300 of the actuator housing 202. However, in other embodiments, at least a portion of the actuator housing 202 may be removed or missing along the slot 204.

In the illustrated embodiment, the connection between the valve stem 106 and the connector 108 may be verifiable, for example, by examining a position of the actuator housing 202 relative to the bonnet 104. For example, in the illustrated embodiment, the opening 218 illustrates that the lip 206 extends into the slot 204. The slot 204, for example, may be marked illustrating a location indicative of coupling between the valve stem 106 and the connector 108. In other words, interference between the valve stem 106 and the connector 108 will block movement of the actuator housing 202 with respect to the bonnet 104, which may provide a visual indication of a problem to an operator. In the embodiment illustrated in FIG. 3, the valve stem 106, specifically the overhang 234 and associated neck 302, are arranged within the t-slot connector opening 228, thereby providing a connection between the valve stem 106 and the actuator 102 to transmit force to the valve stem 106.

As described above, the actuator housing 202 illustrated in FIG. 3 includes the opening 218, which enables installation of the bonnet 104 into the slot 204. The opening 218 may be sealed or otherwise utilized to secure the bonnet 104 within the slot 204, for example, via the fastener apertures 304 positioned at the opening 218.

Figure 4:
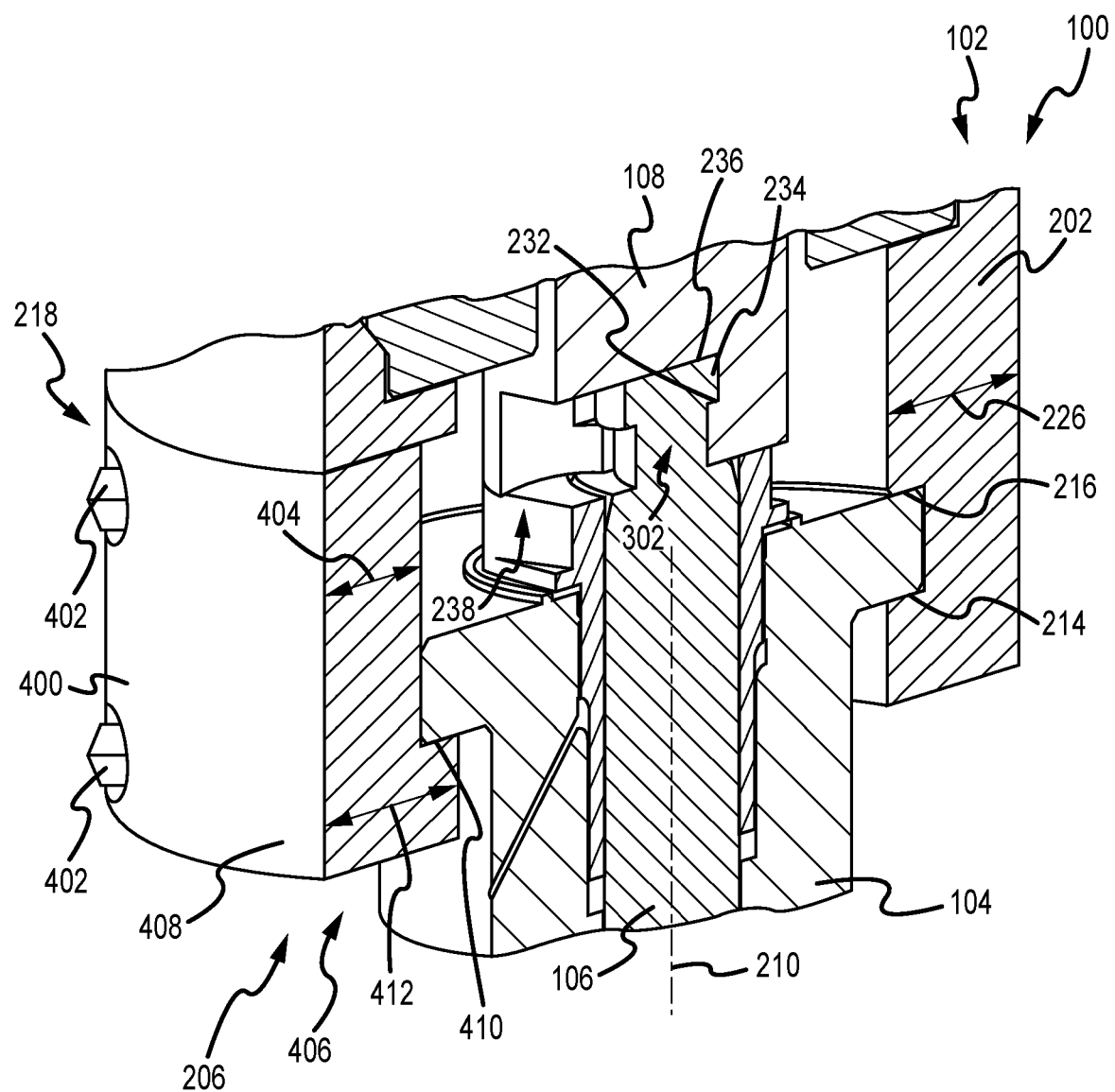
FIG. 4 is a cross-sectional view of an embodiment of an actuator housing with a cover, in accordance with embodiments of the present disclosure.

FIG. 4 is a partial cross-sectional perspective view of an embodiment of the valve assembly 100 illustrating a cover 400 positioned within the opening 218 of the actuator housing 202. The illustrated cover 400 is secured to the actuator housing 202 via fasteners 402, which may align with the fastener apertures 304. In various embodiments, the cover 400 has a thickness 404, which may be substantially equal to the housing thickness 226. However, as noted above, dimensions of the cover 400 may be particularly selected based on expected operating conditions.

The illustrated cover 400 further includes a cover arm 406 that extends radially inward from a surface 408 of the cover 400. The cover arm 406 may be utilized as a cover shoulder 410, which may act as a load member to receive at least a portion of the force generated by the actuator 102. The cover arm 406 extends a radial length 412 from the surface 408, which may be substantially equal to the shoulder 214 of the actuator housing 202. In the illustrated embodiment, the cover 400 does not include a stop, similar to the stop 216, but it should be appreciated that in other embodiments the stop may be included.

It should be appreciated that embodiments of the present disclosure may include anti-rotation features, such as an aperture and associated fastener to couple the cover 400 directly to the bonnet 104. However, in other embodiments, the bonnet 104 and/or actuator housing 202 may be free to rotate about the axis 210. For example, because radial movement of the actuator housing 202 is blocked, rotation will not change or otherwise decouple the valve stem 106 from the connector 108. That is, the restriction of radial movement of the bonnet 104 with respect to the actuator housing 202 (or of the actuator housing 202 with respect to the bonnet 104), maintains the position of the overhang 234 and neck 302 within the connector opening 228. As a result, the engagement shoulder 232 and connector stop 236 may be utilized to transmit forces to the valve stem 106.

Figure 5:
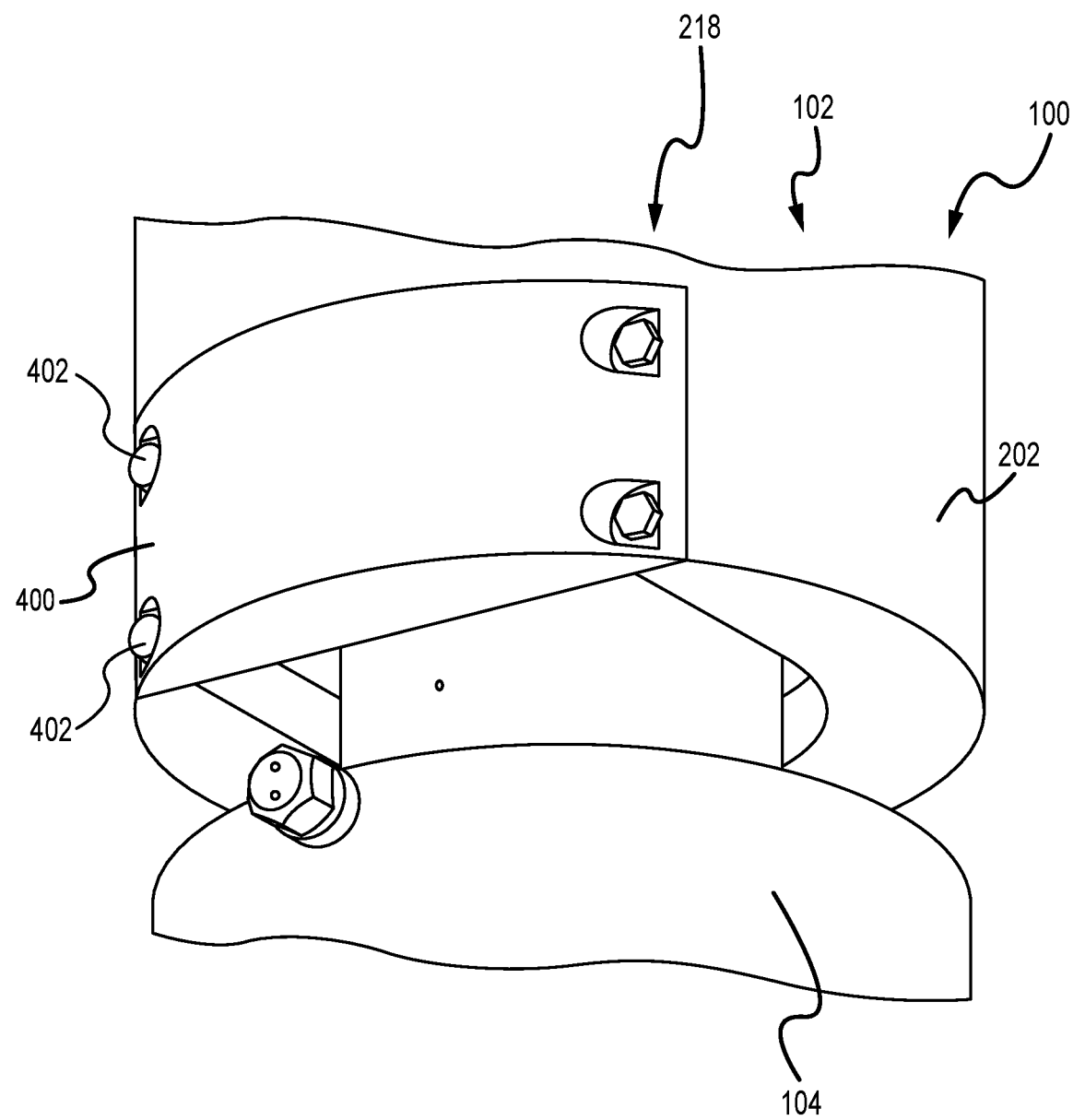
FIG. 5 is a perspective view of an embodiment of an actuator housing with a cover, in accordance with embodiments of the present disclosure.

FIG. 5 is a perspective view of an embodiment of the valve assembly 100 including the cover 400 fixed to the actuator housing 202. In the illustrated embodiment, the fasteners 402 engage the actuator housing 202 to arrange the cover 400 over the opening 218, thereby blocking radial movement of the actuator housing 202 relative to the axis 210. In the illustrated embodiment, the cover 400 is opaque, but in other embodiments, the cover 400 may include a window or view port, which may include a true position indicator or the like. That is, an axial position of the valve stem 106 may be detectable through the window or view port. As described above, in certain embodiments, additional fasteners may be utilized, for examples, fasteners to couple the cover 400 to the bonnet 104.

Embodiments of the present disclosure enable connection between the actuator 102 and the bonnet 104 without increasing an axial distance of the valve assembly 100. That is, in various embodiments, extra fittings or components are not arranged between the actuator 102 and the bonnet 104, thereby enabling a substantially compact system. Furthermore, as described above, installation and removal of the actuator 102 may be simplified, which reduces time spent on installation. Additionally, embodiments utilized fewer parts, which further simplifies installation.

Figure 6:
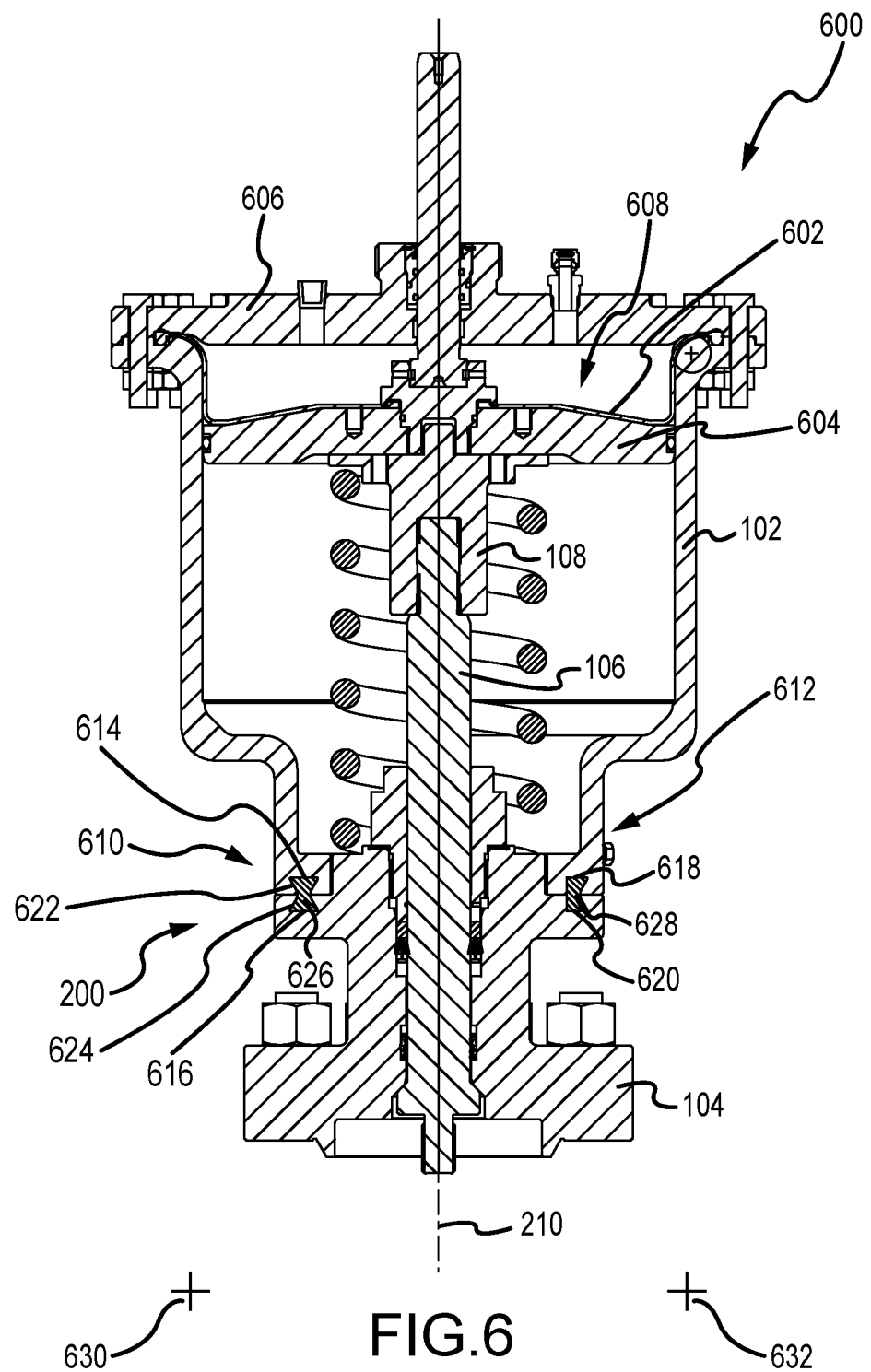
FIG. 6 is a schematic cross-sectional view of an embodiment of a valve assembly having an actuator, in accordance with embodiments of the present disclosure.

FIG. 6 is a cross-sectional side view of a valve assembly 600 that includes the coupling mechanism 200 to enable quick connections between the actuator 102 and the bonnet 104. The valve assembly 600 shares many features with the valve assembly 100 described in FIG. 1, but the illustrated 102 includes a flexible diaphragm 602 (e.g., bladder), extending across at least a portion of an actuator chamber. The diaphragm 602 is coupled to a support plate 604. In operation, a fluid (e.g., a gas, a liquid, etc.) is directed through a top 606 into a pressure chamber 608. The fluid drives the support plate 604 downward, which also drives the connector 108, which is coupled to the support plate 604. Removal of the fluid from the pressure chamber 608 may facilitate movement of the support plate 604 in the opposite direction. Other features of the valve assembly, such as the valve stem 106, passage (not pictured), and the like may be substantially similar to those illustrated in FIG. 1.

The valve assembly 600 further includes a coupling mechanism 200, which may be combined with one or more features of the coupling mechanism described with respect to FIG. 1, such as the connector opening 228. The illustrated coupling mechanism 200 includes a first set of grooves 610 and a second set of grooves 612. The first set of grooves 610 includes a first actuator groove 614 and a first bonnet groove 616. The second set of grooves 612 includes a second actuator groove 618 and a second bonnet groove 620. In the illustrated embodiment, the first set of grooves 610 are different than the second set of grooves 612, in that the first set of grooves 610 may be referred to as "horizontal grooves" that are substantially dovetails that are mirrored with one another. The second set of grooves 612, however, may be referred to as "vertical grooves" that resembles a dovetail rotated 90 degrees. In other words, the second set of grooves 612 may be formed by the second actuator groove 618 and the second bonnet groove 620 being half dovetails. As will be described below, such an arrangement may reduce confusion for how to couple and align the actuator 102 to the bonnet 104.

In various embodiments, the first set of grooves 610 and the second set of grooves 612 are positioned on mating faces 622, 624 of the actuator 102 and the bonnet 104. When the grooves 614, 616 and the grooves 618, 620 are aligned, respective rails 626, 628 may be installed to couple the actuator 102 to the bonnet 104. The rails 626, 628 may also block revolution of the actuator 102 and/or the bonnet 104 about the axis 210.

In the illustrated embodiment, the rails 626, 628 (and the pairs of grooves 610, 612) are aligned along a respective first axis 630 and second axis 632. In the illustrated embodiment, the first axis 630 and the second axis 632 are substantially parallel to one another and perpendicular to the axis 210. However, it should be appreciated that the first axis 630 may be perpendicular to the second axis 632 or at an angle with respect to the second axis 632.

Figure 7:
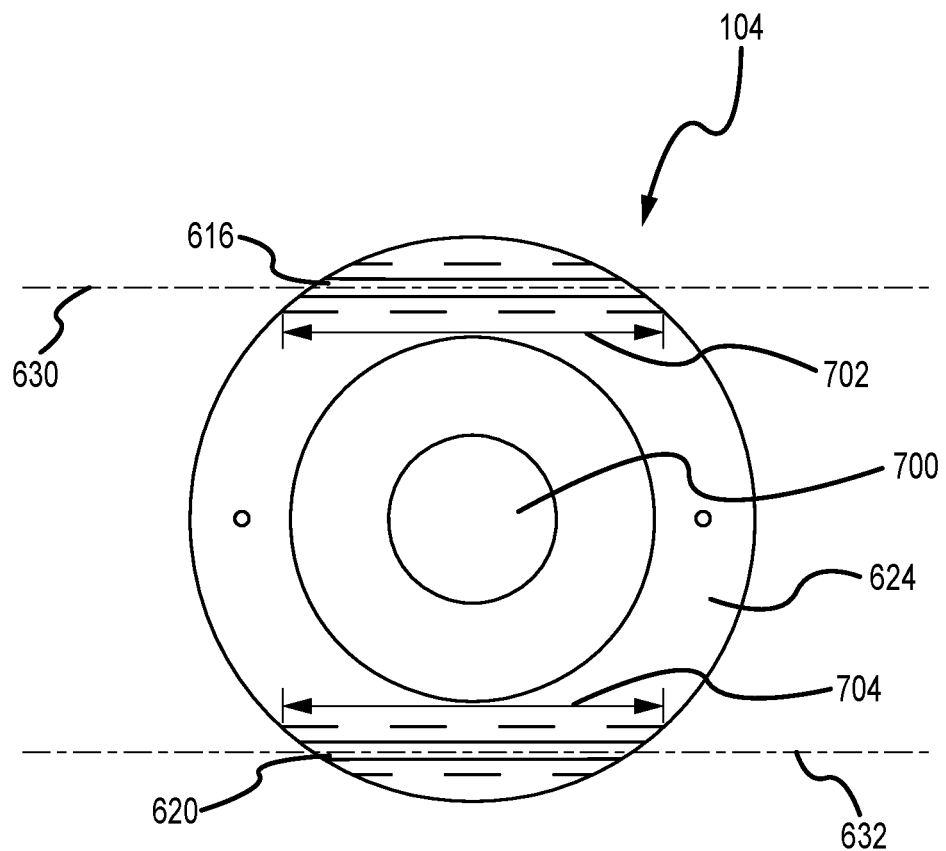
FIG. 7 is a top plan view of an embodiment of a bonnet including a coupling mechanism, in accordance with embodiments of the present disclosure.

FIG. 7 is a top plan view of an embodiment of the bonnet 104, including the first bonnet groove 616 and the second bonnet groove 620 arranged along the mating face 624 of the bonnet 104. In the illustrated embodiment, both of the first bonnet groove 616 and the second bonnet groove 620 are arranged radially outward from a bore 700 such that the first and second bonnet grooves 616, 620 do not intersect the bore 700. Such an arrangement, as described above, may also be enabled by arranging the grooves 616, 620 perpendicular to one another.

In the illustrated embodiment, both of the first bonnet groove 616 and the second bonnet groove 620 extend along respective lengths 702, 704 across the mating face 624.

However, it should be appreciated that the grooves 616, 620 may not extend along the entire mating face 624, and may extend only along a portion of the mating face 624.

Figure 8A:
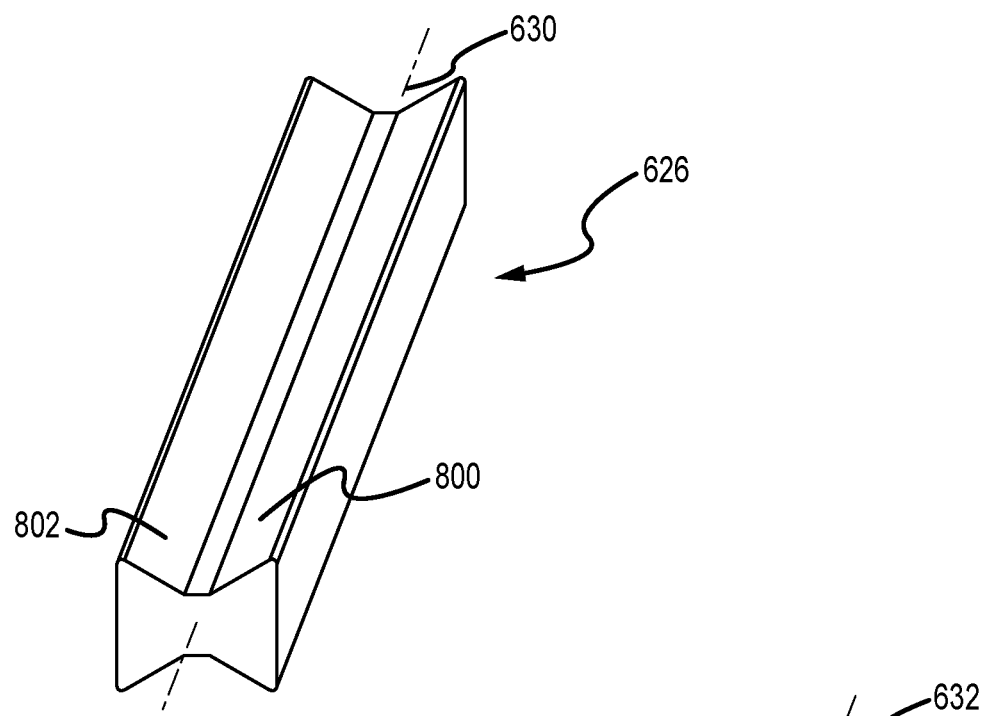
FIGS. 8A and 8B are perspective views of embodiments of rails used with a coupling mechanism, in accordance with embodiments of the present disclosure.
Figure 8B:
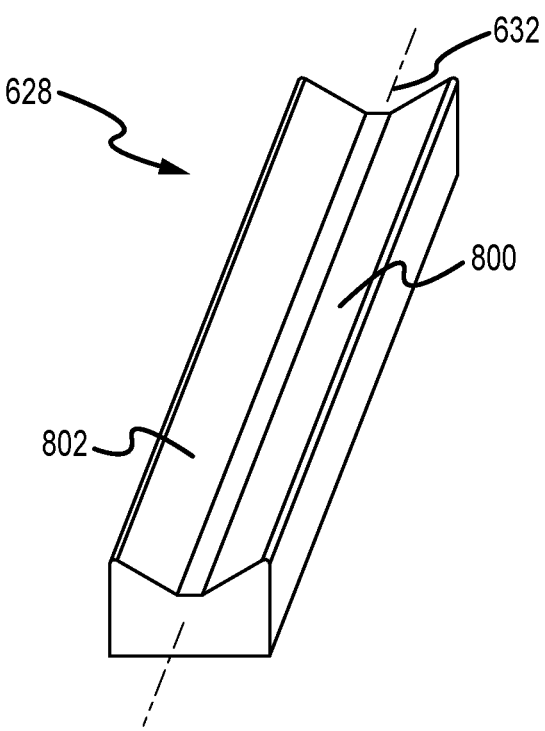

FIGS. 8A and 8B are perspective views of embodiments of the rail 626 and the rail 628, respectively. Turing to the rail 626, which is operable with the first set of grooves 610, the mirrored dovetail arrangement forms the rail 626 that is substantially symmetrical about the first axis 630. As shown, the rail 626 is sized to fit within the first set of grooves 610. Similarly, the rail 628 is operable to fit within the second set of grooves 612 and is substantially symmetrical about the second axis 632. In operation, respective load edges 800, 802 of the rails 626, 628 may be utilized to receive forces from the actuator 102 to block separation of the actuator 102 and the bonnet 104. For example, the load edge 802 may block downward axial movement (and also rotation) while the load edge 800 may block upward axial movement (and also rotation).

Figures 9A, 9B:
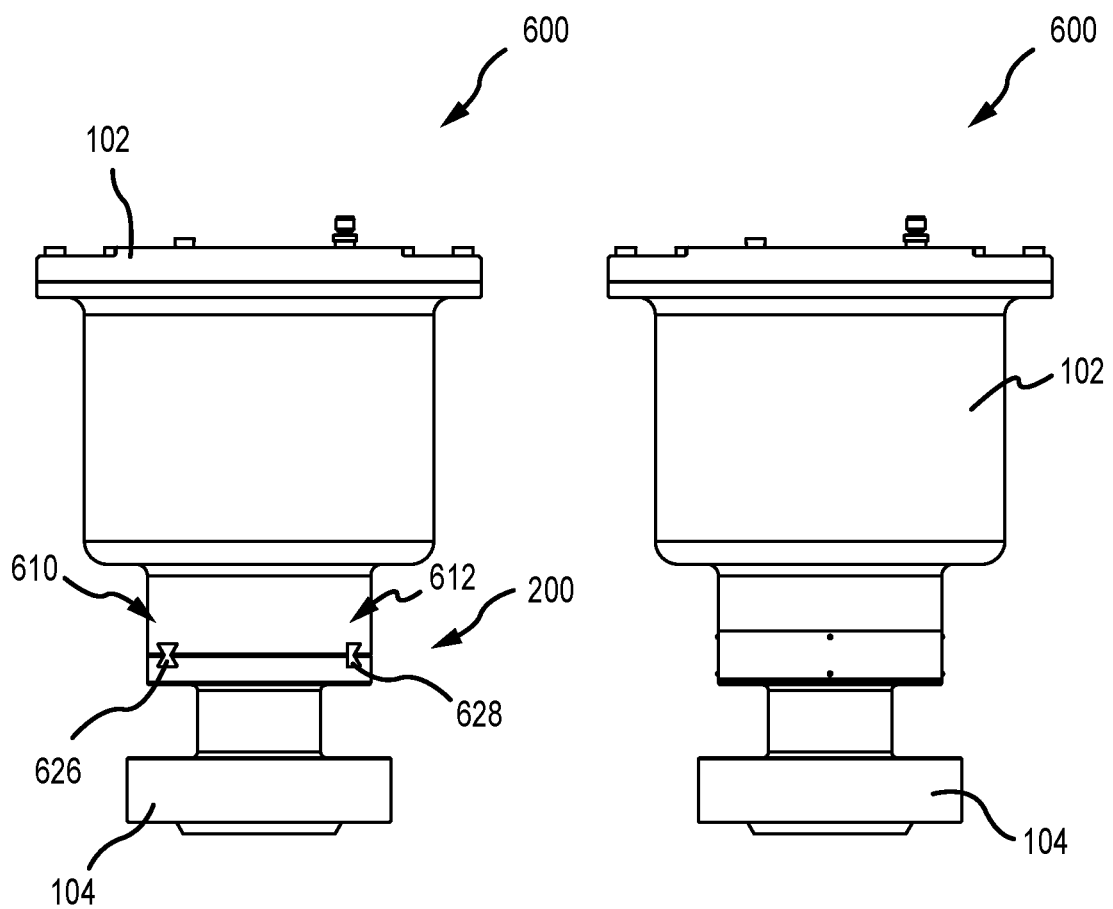
FIGS. 9A and 9B are perspective views of embodiments of valve assemblies using a coupling mechanism, in accordance with embodiments of the present disclosure.

FIGS. 9A and 9B are side elevational views of embodiments of the valve assembly 600 including the actuator 102 coupled to the bonnet 104 via the coupling mechanism 200, which includes the rails 626, 628. As shown, the rails 626, 628 installed within the first set of grooves 610 and the second set of grooves 612 couple the actuator 102 to the bonnet 104. Furthermore, rotation between the actuator 102 and the bonnet 104 is blocked. FIG. 9B illustrates that both of the first set of grooves 610 and the second set of grooves 612 are on the same "side" of the valve assembly 600. However, as noted above, in various embodiments the first set of grooves 610 may be substantially perpendicular to or at another angle relative to the second set of grooves 612. As a result, the side illustrated in FIG. 9B may include the first set of grooves 610 and/or the second set of grooves 612. Furthermore, it should be appreciated that more or fewer sets of grooves may be utilized, and that two are used only as an example. For example, expected operating conditions may enable a single set of grooves.

Figure 10:
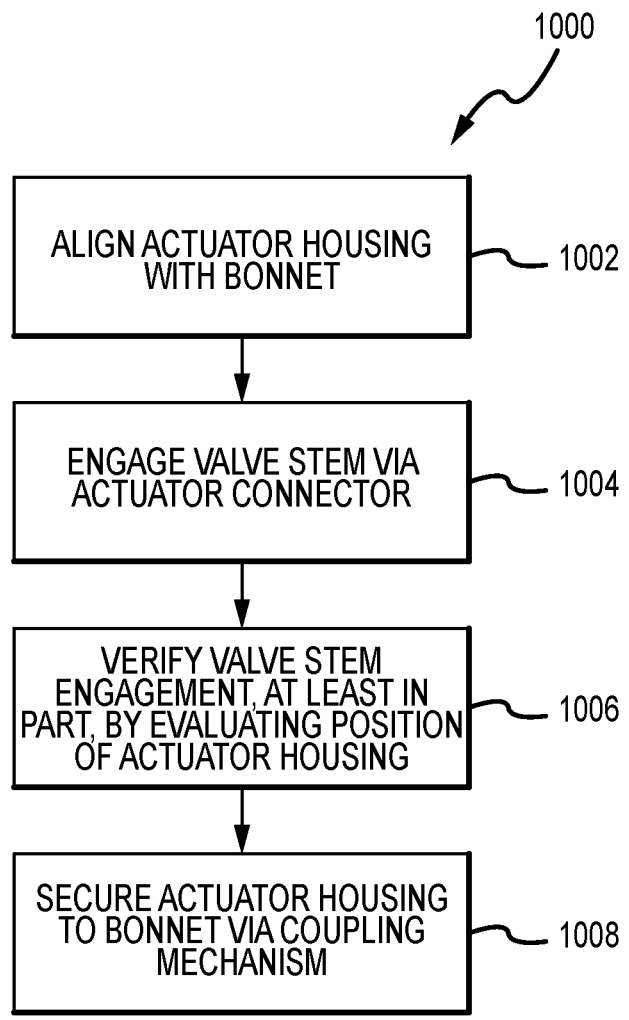
FIG. 10 is a flow chart of an embodiment of a method for joining an actuator to a bonnet, in accordance with embodiments of the present disclosure.

FIG. 10 is a flow chart of an embodiment of a method 1000 for forming the valve assembly using the coupling mechanism. It should be appreciated that for this method and all methods described herein that the steps may be performed in any order, or in parallel, unless otherwise explicitly stated. Furthermore, there may be more or fewer steps. In this example, an actuator is aligned with a bonnet (block 1002). This may include aligning an actuator housing with a bonnet, which may be particularly selected for use with the actuator housing. In various embodiments, a valve stem is engaged by a connector (block 1004). The connector may be associated with the actuator, which may transfer movement to the valve stem via the connection between the connector and the valve stem. In various embodiments, engagement may be a result of the alignment of the actuator housing and the bonnet. The valve stem engagement is verified (block 1006). For example, a window or opening may be provided in the actuator housing to verify engagement. Furthermore, in various embodiments, indicators may be positioned on the actuator housing to signify engagement, such as expected positions of components of the actuator housing relative to the bonnet. The actuator housing is then secured to the bonnet (1006). For example, the coupling mechanism may be utilized to form a quick connection between the actuator and the bonnet. In various embodiments, the quick connection may include a double horseshoe connector, such as that illustrated in FIGS. 1-5. In other embodiments, a rail system may be utilized, such as the system illustrated in FIGS. 6-9. In this manner, the actuator may be quickly coupled to the bonnet.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for coupling components of a valve assembly, comprising:
an actuator housing having a slot arranged in an interior portion, the slot extending circumferentially about at least a portion of a circumference of the interior portion;
a bonnet positioned at least partially within the interior portion of the actuator housing, the bonnet having a lip extending at least partially into the slot;
an actuator connector positioned within the interior portion having a connector opening adapted to receive a valve stem;
a cover extending over an opening formed in the actuator housing, wherein the cover is coupled to the bonnet to block rotational movement of the actuator housing; and
the valve stem, at least a portion of the valve stem arranged within the connector opening, wherein radial movement of the valve stem is blocked, at least in part, by an interface between the slot and the lip.

2. The system of claim 1, further comprising:
an opening extending through at least a portion of the actuator housing, the opening arranged proximate the slot, wherein the opening receives radial movement of the bonnet into the interior portion.

3. The system of claim 2, further comprising:
a cover extending over the opening, the cover coupled to the actuator housing and blocking radial movement of the bonnet out of the interior portion.

4. The system of claim 3, wherein the cover comprises:
a cover arm extending a first length from a surface of the cover, the first length arranging at least a portion of the cover arm axially lower than the lip.

5. The system of claim 1, wherein the connector opening comprises:
an engagement shoulder; and
a connector stop; wherein at least a portion of the valve stem is arranged between the engagement shoulder and the stop.

6. The system of claim 1, wherein a thickness of the lip is less than a width of the slot, the actuator housing being rotatable about the bonnet.

7. The system of claim 1, further comprising:
an opening extending through at least a portion of the actuator housing, the opening being substantially aligned with the connector opening such that engagement of the valve stem by the connector opening occurs close in time with engagement of the lip with the slot.

8. The system of claim 1, wherein the connector opening is substantially t-shaped and receives a neck of the valve stem including an overhang.

9. A system for coupling components of a valve assembly, comprising:
an actuator including a first mating face at a bottom end;
a bonnet including a second mating face at a top end, the first mating face abutting against the second mating face;
a first actuator groove, formed at the first mating face;

a first bonnet groove, formed at the second mating face, the first actuator groove aligning with the first bonnet groove to form a passage between the actuator and the bonnet;

a first rail extending through the passage, the first rail blocking movement of the actuator with respect to the bonnet in at least two directions;

a second actuator groove, formed at the first mating face;

a second bonnet groove, formed at the second mating face, the second actuator groove aligning with the second bonnet groove to form a second passage between the actuator and the bonnet; and a second rail extending through the passage, the second rail blocking movement of the actuator with respect to the bonnet in at least two directions.

10. The system of claim 9, wherein a first passage shape is different than a second passage shape.

11. The system of claim 9, wherein the first passage and the second passage are parallel.

12. The system of claim 9, wherein an angle between the first passage and the second passage is one of acute or obtuse.

13. The system of claim 9, wherein the first actuator groove and the first bonnet groove are symmetrical about an axis extending through the first passage.

14. The system of claim 9, wherein at least one of the first actuator groove or the first bonnet groove is a dovetail.

15. The system of claim 9, wherein the first passage extends from a first end of the bonnet to a second end of the bonnet.

16. The system of claim 9, wherein the first rail blocks both axial movement and rotational movement of the actuator with respect to a longitudinal axis.

17. A method for coupling valve assembly components together, comprising:

aligning an actuator housing with a bonnet to align an axial position between an actuator connector and a valve stem;

engaging the valve stem with the actuator connector responsive to radial movement of the actuator housing relative to the bonnet;

determining the actuator housing is in an engaged position; and coupling the actuator housing to the bonnet via a coupling mechanism to block movement of the actuator housing in at least two directions.

18. The method of claim 17, further comprising:

positioning the bonnet at an opening to the actuator housing, the opening formed in a side of the actuator housing;

radially moving the bonnet into the actuator housing; and engaging a slot of the actuator housing with a lip of the bonnet.

19. The method of claim 17, wherein coupling the actuator housing to the bonnet comprises:

inserting a rail into a groove formed between respective mating faces of the actuator and the bonnet.

* * * * *